US009176532B2

(12) United States Patent
Tages et al.

(10) Patent No.: US 9,176,532 B2
(45) Date of Patent: *Nov. 3, 2015

(54) PORTABLE DEVICE CASE WITH CORNER PROTECTION ELEMENT

(71) Applicant: A.G. Findings & Mfg. Co., Inc., Fort Lauderdale, FL (US)

(72) Inventors: Fernando Tages, Coral Springs, FL (US); Daniel Acero, Coral Springs, FL (US); Harold Goradesky, Davie, FL (US)

(73) Assignee: A.G. Findings & Mfg. Co., Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,930

(22) Filed: Oct. 28, 2013

(65) Prior Publication Data

US 2014/0048441 A1 Feb. 20, 2014

Related U.S. Application Data

(63) Continuation of application No. 13/528,374, filed on Jun. 20, 2012, now Pat. No. 8,584,847.

(60) Provisional application No. 61/499,511, filed on Jun. 21, 2011.

(51) Int. Cl.
*B65D 85/00* (2006.01)
*G06F 1/16* (2006.01)
*H04B 1/3888* (2015.01)
*A45C 13/36* (2006.01)
*A45C 11/00* (2006.01)

(52) U.S. Cl.
CPC ............ *G06F 1/1633* (2013.01); *H04B 1/3888* (2013.01); *A45C 13/36* (2013.01); *A45C 2011/002* (2013.01)

(58) Field of Classification Search
CPC G06F 1/1628; A45C 2013/025; A45C 13/02; A45C 11/00; B65D 85/64
USPC .......................................... 206/320, 576, 586
See application file for complete search history.

(56) References Cited

U.S. PATENT DOCUMENTS

| 2,004 | A | 3/1841 | Harris et al. |
|---|---|---|---|
| 89,570 | A | 5/1869 | Fellows |
| 4,006,764 | A | 2/1977 | Yamamoto et al. |
| 4,584,718 | A | 4/1986 | Fuller |
| 4,703,161 | A | 10/1987 | McLean |
| 5,025,921 | A | 6/1991 | Gasparaitis et al. |
| 5,175,873 | A | 12/1992 | Goldenberg et al. |
| 5,386,084 | A | 1/1995 | Risko |
| 5,586,002 | A | 12/1996 | Notarianni |
| 5,713,466 | A | 2/1998 | Tajima |
| 5,812,188 | A | 9/1998 | Adair |
| 5,990,874 | A | 11/1999 | Tsumura et al. |
| 5,996,790 | A | 12/1999 | Yamada et al. |

(Continued)

*Primary Examiner* — Jacob K. Ackun
(74) *Attorney, Agent, or Firm* — Christopher & Weisberg, P.A.

(57) ABSTRACT

A case for a mobile device includes a housing sized to receive the mobile device. The housing defines a plurality of corner portions, each corner portion includes an interior wall. The mobile device is spaced a distance from the interior wall of the corner portions when disposed within the housing. The housing includes a plurality of protrusions disposed along at least a portion of the interior wall, the protrusions are operable to space the mobile device a distance away from the interior wall.

15 Claims, 6 Drawing Sheets

(56) References Cited

U.S. PATENT DOCUMENTS

| | | |
|---|---|---|
| 6,031,524 A | 2/2000 | Kunert |
| 6,052,279 A | 4/2000 | Friend et al. |
| 6,138,826 A | 10/2000 | Kanamori et al. |
| 6,317,313 B1 | 11/2001 | Mosgrove et al. |
| 6,349,824 B1 | 2/2002 | Yamada |
| 6,415,138 B2 | 7/2002 | Sirola et al. |
| 6,426,870 B1 | 7/2002 | Oross et al. |
| 6,525,928 B1 | 2/2003 | Madsen et al. |
| 6,532,152 B1 | 3/2003 | White et al. |
| 6,536,589 B2 | 3/2003 | Chang |
| 6,608,119 B2 | 8/2003 | Tanabe et al. |
| 6,646,864 B2 | 11/2003 | Richardson |
| 6,646,866 B2 | 11/2003 | Kao |
| 6,659,274 B2 | 12/2003 | Enners |
| 6,721,651 B1 | 4/2004 | Minelli |
| 6,785,566 B1 | 8/2004 | Irizarry |
| 6,844,845 B1 | 1/2005 | Whiteside et al. |
| 6,896,134 B2 | 5/2005 | Russell et al. |
| 6,983,130 B2 | 1/2006 | Chien et al. |
| 6,995,976 B2 | 2/2006 | Richardson |
| 7,069,063 B2 | 6/2006 | Halkosaari et al. |
| 7,130,185 B2 | 10/2006 | Chen et al. |
| 7,158,376 B2 | 1/2007 | Richardson et al. |
| 7,180,735 B2 | 2/2007 | Thomas et al. |
| 7,230,823 B2 | 6/2007 | Richardson et al. |
| 7,312,984 B2 | 12/2007 | Richardson et al. |
| 7,520,389 B2 * | 4/2009 | Lalouette ...................... 206/722 |
| 7,609,512 B2 | 10/2009 | Richardson et al. |
| D615,535 S | 5/2010 | Richardson et al. |
| 7,907,394 B2 | 3/2011 | Richardson et al. |
| 7,938,260 B2 | 5/2011 | Lin |
| 8,204,561 B2 | 6/2012 | Mongan et al. |
| 2002/0079244 A1 | 6/2002 | Kwong |
| 2002/0137475 A1 | 9/2002 | Shou et al. |
| 2003/0217940 A1 | 11/2003 | Russell et al. |
| 2004/0089570 A1 | 5/2004 | Chien et al. |
| 2005/0139498 A1 | 6/2005 | Goros |
| 2005/0150796 A1 | 7/2005 | Wong et al. |
| 2005/0284791 A1 | 12/2005 | Sadow |
| 2010/0008028 A1 | 1/2010 | Richardson et al. |
| 2010/0089779 A1 | 4/2010 | Bowers |
| 2010/0096284 A1 * | 4/2010 | Bau .............................. 206/320 |
| 2011/0226545 A1 | 9/2011 | Richardson et al. |
| 2011/0228458 A1 | 9/2011 | Richardson et al. |
| 2011/0228459 A1 | 9/2011 | Richardson et al. |
| 2012/0031788 A1 * | 2/2012 | Mongan et al. .............. 206/320 |
| 2012/0043235 A1 * | 2/2012 | Klement ...................... 206/320 |
| 2012/0118773 A1 * | 5/2012 | Rayner ........................ 206/320 |
| 2012/0211382 A1 | 8/2012 | Rayner |

\* cited by examiner

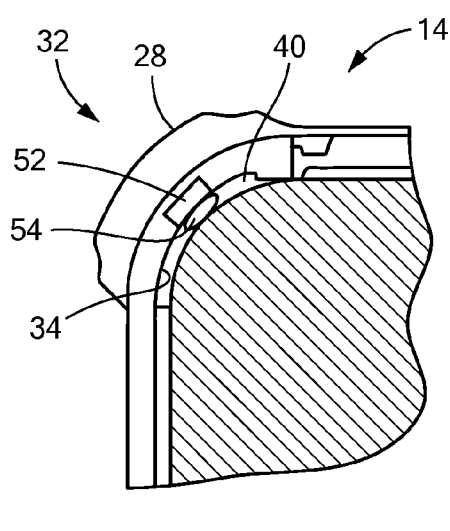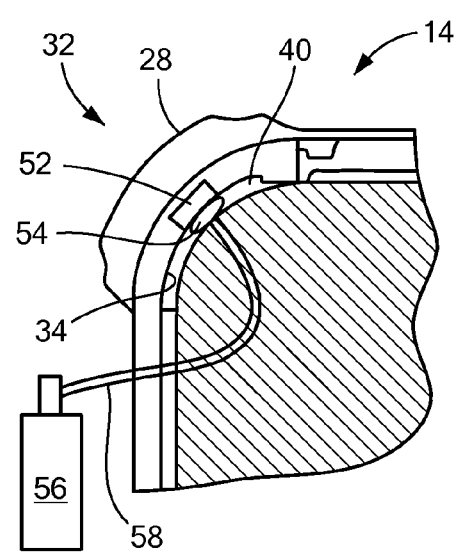
*FIG. 5*  *FIG. 6*

PORTABLE DEVICE CASE WITH CORNER PROTECTION ELEMENT

CROSS-REFERENCE TO RELATED APPLICATION

This application is a Continuation application of U.S. patent application Ser. No. 13/528,374 filed Jun. 20, 2012, which claims priority to U.S. Provisional Application Ser. No. 61/499,511, filed Jun. 21, 2011, the entirety of both of which is incorporated herein by reference.

STATEMENT REGARDING FEDERALLY SPONSORED RESEARCH OR DEVELOPMENT n/a

FIELD

The present invention relates to a mobile device cases, and in particular, a corner protection element.

BACKGROUND

As mobile phones and other mobile electronic devices become more technologically advanced and include more features, the cost to purchase these mobile devices increases, as does the cost to replace them should they break. To prophylactically protect such devices from damage or breakage, protective cases have been devised to reduce the risk that a mobile device breaks should it be dropped or otherwise exposed to an impact force.

In particular, two types of materials have generally been employed to reduce the impact force on a mobile device, namely, elastic and resilient materials that absorb impact forces ("soft cases"), and fracture-resistant plastics ("hard cases"). Mobile device cases typically include one or the other of these materials, or include a softer resilient case surrounding a harder plastic case. The resultant device cases often suffer from protection limitations and a low quality user experience. For example, cases exclusively composed of high durometer plastics, or similarly hard materials, often include jagged or sharp corners providing an uncomfortable feeling in the user's hand. Further, high durometer plastic cases, while lending overall durability to the case, often rupture at connection points on two-piece clam shelled cases owing to a lack of resiliency, potentially exposing the mobile device to an impact force. In particular, should a mobile device case be dropped on one of its corners, the impact may cause the corners to flex inward and transfer the entire impulse force to the mobile device, which often leads to fracture of the device case and the mobile phone.

Conversely, soft resilient cases such as those made from rubber or other elastomeric materials, while providing impact protection, are often large and unwieldy, which mitigates the benefits of having a slim profile mobile device. Further, rubber or elastomeric cases still suffer from the drawbacks of hard cases, namely flexion at the corners during impact, transferring the impact force to the mobile device. As a result, mobile device cases composed of rubber or elastomers, while providing some degree of impact protection, may not be aesthetically desirable to consumers and still transfer impact forces to the mobile device at the corners.

SUMMARY

In one embodiment a case for a mobile device is provided. The case includes a housing sized to receive the mobile device. The housing defines a plurality of corner portions, each corner portion includes an interior wall. The mobile device is spaced a distance from the interior wall of the corner portions when disposed within the housing. The housing includes a plurality of protrusions disposed along at least a portion of the interior wall, the protrusions are configured to space the mobile device a distance away from the interior wall.

In another embodiment, the case includes a housing sized to receive a mobile device. A side wall is included enclosing a portion of the housing. A plurality of corner portions is included, each corner portion defines a deformation region within a portion of the interior of the side wall. A plurality of protrusions are included and disposed along at least a portion of the interior of the side wall, the protrusions are configured to space the mobile device a distance away from the interior of the side wall. The mobile device is retained a distance from the deformation region when disposed within the housing.

In yet another embodiment, the case includes a housing sized to receive a mobile device. A first portion has a side wall enclosing a portion of the first portion. A second portion is removably matable to the first portion and defines a volume therein when mated to the first portion. The first portion defines a plurality of corner portions, each corner portion defines a deformation region within the interior of the side wall. A plurality of protrusions spaces the mobile device a distance from the deformation region when disposed within the housing.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 5 is an enlarged view of an alternative embodiment of Detail A in FIG. 4;

FIG. 6 is an enlarged view of an another alternative embodiment of Detail A in FIG. 4.

DETAILED DESCRIPTION

Figure 1:
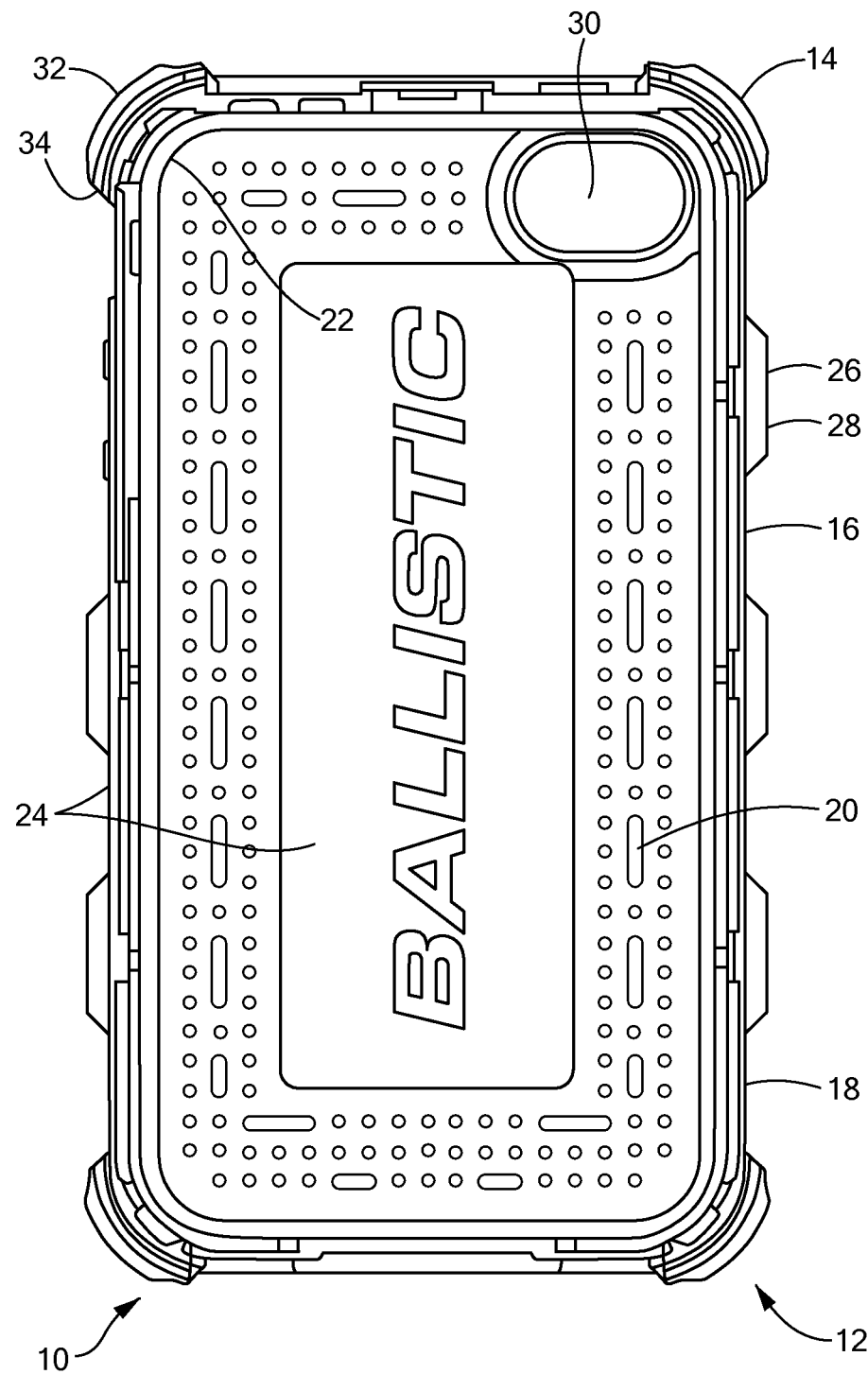
FIG. 1 is a top inside view of first portion of a mobile device case constructed in accordance with the principles of the present invention.

Now referring to the drawings in which like reference designators refer to like elements, there is shown in FIG. 1 a mobile device case constructed in accordance with the principles of the present invention and designated generally as "10." The case 10 may include a housing 12 sized to receive and retain a mobile device, which may be a multi-piece clam shell or a unitary structure. The housing 12 may include a first portion 14 sized to receive and at least partially enclose the mobile device. For example, the dimensions of the first portion 14 may be pre-fabricated to contour a specific mobile device, for example an IPHONE, IPAD, or other mobile phone or tablet computer, and thus may vary depending on the size of the mobile device.

The first portion 14 may further include a side wall 16 defining a first perimeter 18 around the interior of the first portion 14. The side wall 16 surrounds the first portion 14 and may define a height substantially commensurate with a height of the mobile device housed within the first portion 14, or any height. The first portion 14 may include, and be partially composed of, a first layer of material 20. The first layer of material 20 may include a substantially resilient material, for example, thermoplastic polyurethane (TPU) or a material with a similar durometer. In an exemplary configuration, approximately 80% of the first layer of material 20 has a Shore A durometer of substantially 60 A and approximately 20% of the first layer of material 20 has a Shore A durometer of substantially 75 A.

The first layer of material 20 may further define a substantially closed loop about an inner periphery of a first major side 22 of the first portion 14 and/or may be disposed on a portion or all of the first side 22. The first layer of material 20 may operate to cushion the mobile device when disposed within the first portion 14. A pattern may be defined by the first layer of material 20 on the first side 22, for example, a stippled pattern, or other patterns that reduce the amount of material used and/or increase the energy absorption rate of the first layer of material 20.

The first layer of material 20 may be co-molded with or otherwise disposed on top of the second layer of material 24, which forms the frame of the housing 12 including the side wall 16. In particular, the second layer of material 24 may be composed of a substantially rigid plastic, for example, polycarbonate (PC) or other material with a similar durometer. The second layer of material 24 may have a higher durometer than that of the first layer of material 20, which may lend overall structural support to the housing 12.

Disposed or otherwise molded onto the surface portions the second layer of material 24 may be a third layer of material 26. The third layer of material 26 may have the same, or substantially the same, durometer as the first layer of material 20. For example, the third layer of material 26 may also be composed of TPU or a material with as similar hardness and durometer. The side wall 16 of the first portion 14 may include alternating segments of the second layer of material 24 and third layer of material 26 around the outer surface of the side wall 16. For example, the second layer of material 24 and the third layer of material 26 are disposed adjacent to each other along at least a portion of the side wall 16. In particular, the third layer of material 26 may protrude a distance away from the side wall 16 and be adjacent a flat, or substantially flat, second layer of material 24. For example, the side wall 16 may include a plurality of first segments 28 of the third layer of material 26 along substantially the entire outer perimeter 18 of the first portion 14. The protruding first segments 28 of the third layer of material 26 provide impact protection should the housing 12 be exposed to an impact force. The protruding first segments 28 may substantially span the height of the side wall 16 and may be substantially rectangular in shape, or define any shape or size sufficient to perform the functions described herein.

The first portion 14 may further define a plurality of apertures 30 defined along the side wall 16 and/or the first side 22, sized to receive and/or provide access to one or more controls of the mobile device. For example, the first portion 14 may define an aperture 30 sized to provide access to one or more plug ports in the mobile device, a camera and flash, volume controls, headphones, and the like. Further, the third layer of material 26 may disposed over one or more of the apertures 30 along the side wall 16. For example, the third layer of material 26 may be fabricated to contour and cover one or more of the apertures 30 that covers one or more of the volume controls or on/off switches of the mobile device. This contoured third layer of material 26 may provide a resiliently pressable surface to allow operation of the volume controls on the mobile device while providing a flexible layer of protection.

The first portion 14 may further define curved or substantially right-angled corner portions 32 depending on the corresponding corners of the mobile device to be retained within the first portion 14. For example, as shown in FIG. 1, the first portion 14 defines four corner portions 32 defined by the second layer of material 24. Each corner portion 32 may define an interior wall 34, which is defined at least in part by the side wall 16. The interior wall 34 may define any shape or size to accommodate the corners of a mobile device.

Figure 2:
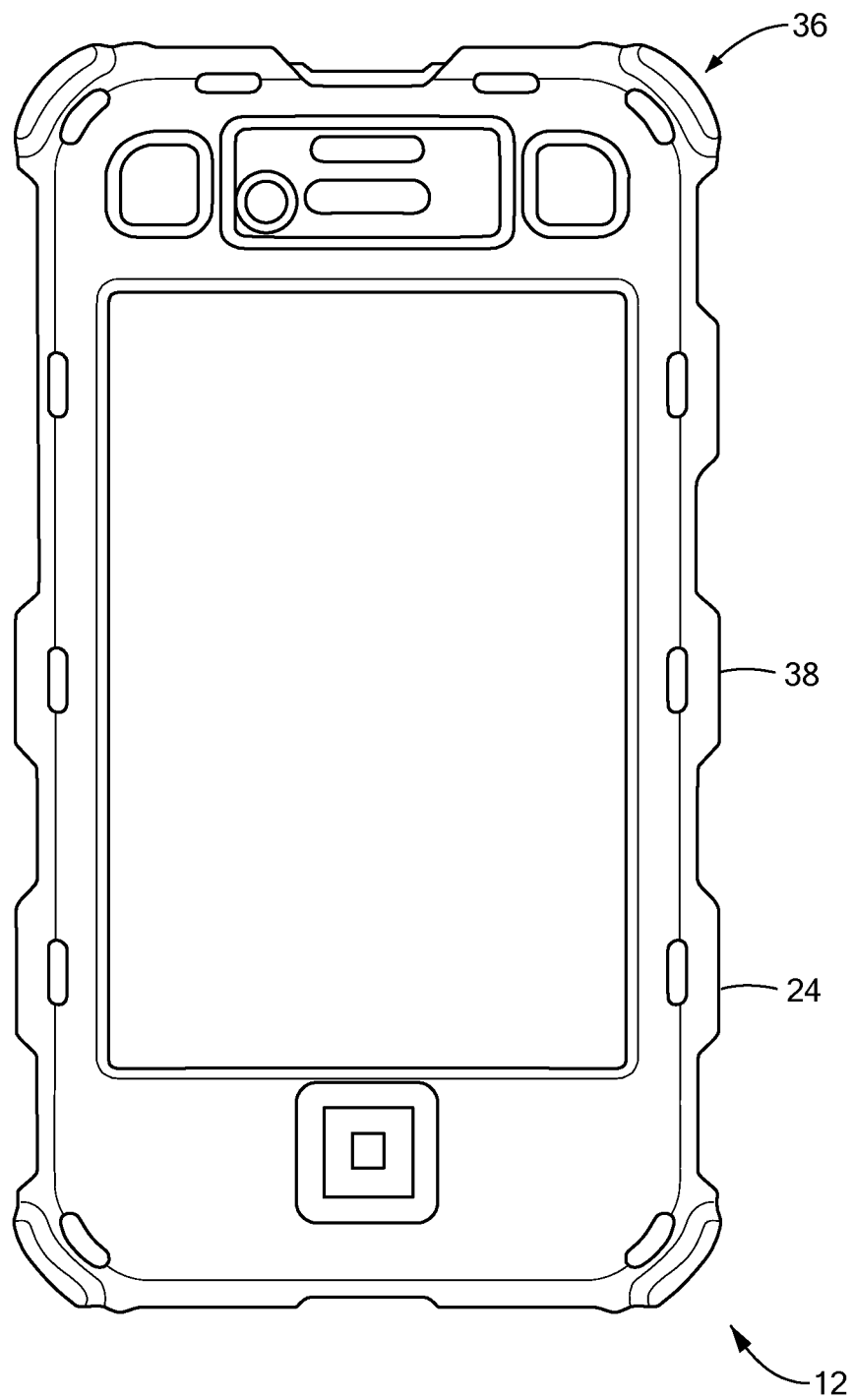
FIG. 2 is a bottom outside view of a second portion of a mobile device case constructed in accordance with the principles of the present invention.

Referring now to FIG. 2, the housing 12 may further include a second portion 36 removeably couplable to the first portion 14. The second portion 36 may be at least partially composed of the same, or substantially the same material as that of the second layer of material 24, for example, PC. One or more layers of TPU, or material with a similar durometer or composition as the first layer of material 20, may be co-molded with the layer of PC. For example, the layer of PC material may be disposed between a layer of TPU above and a layer of TPU below, similar to the layering of materials in the first portion 14. In particular, the layer of TPU molded on top of the layer of PC may define second segments 38 composed of TPU or similar durometer material that correspond to first segments 28 of the first portion 14. For example, the second segments 38 may be substantially positioned and aligned with the first segments 28 when the first portion 14 is mated with the second portion 36 and extend around the periphery of the second portion 36.

Figure 3:
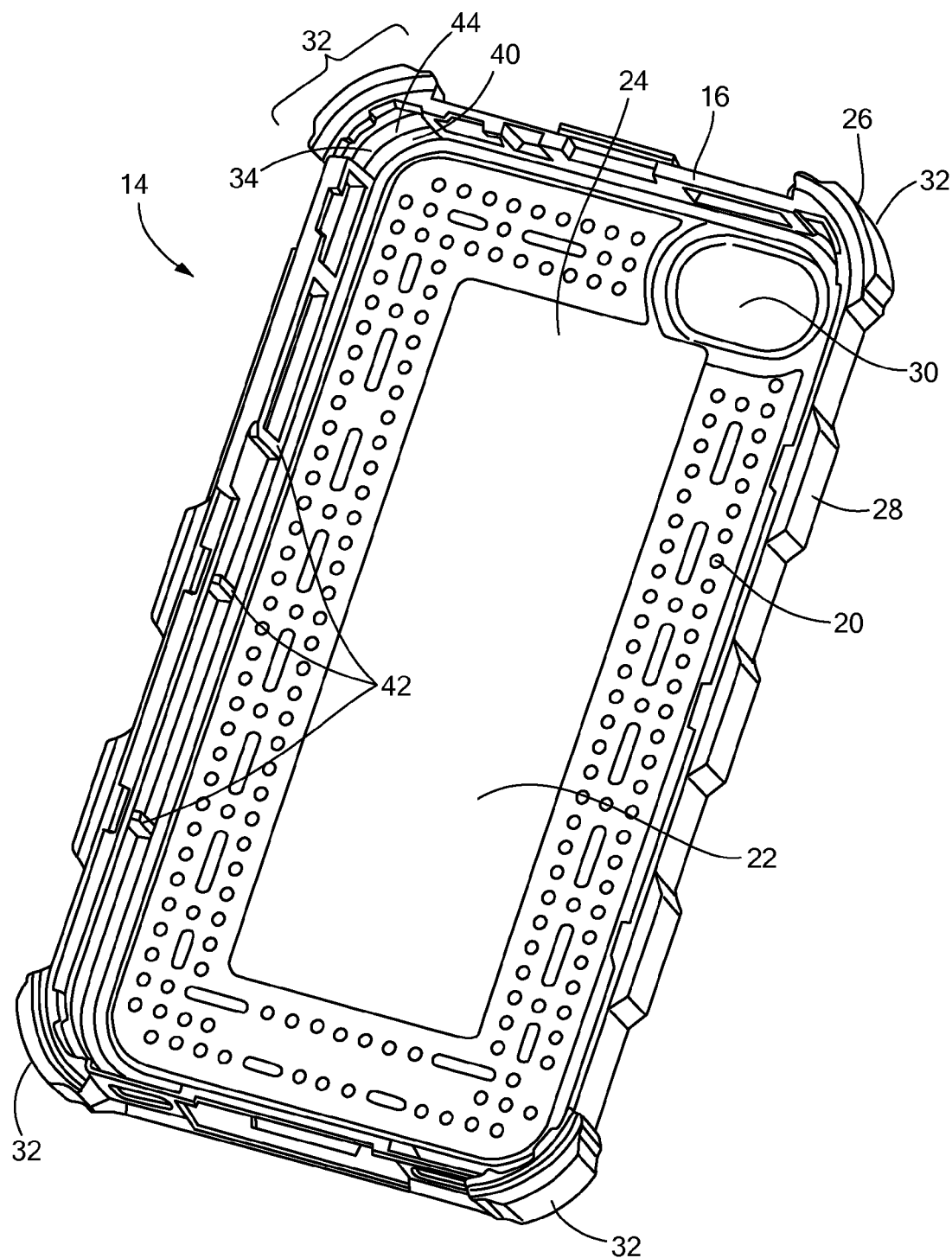
FIG. 3 is a perspective view of the first portion shown in FIG. 1.
Figure 4:
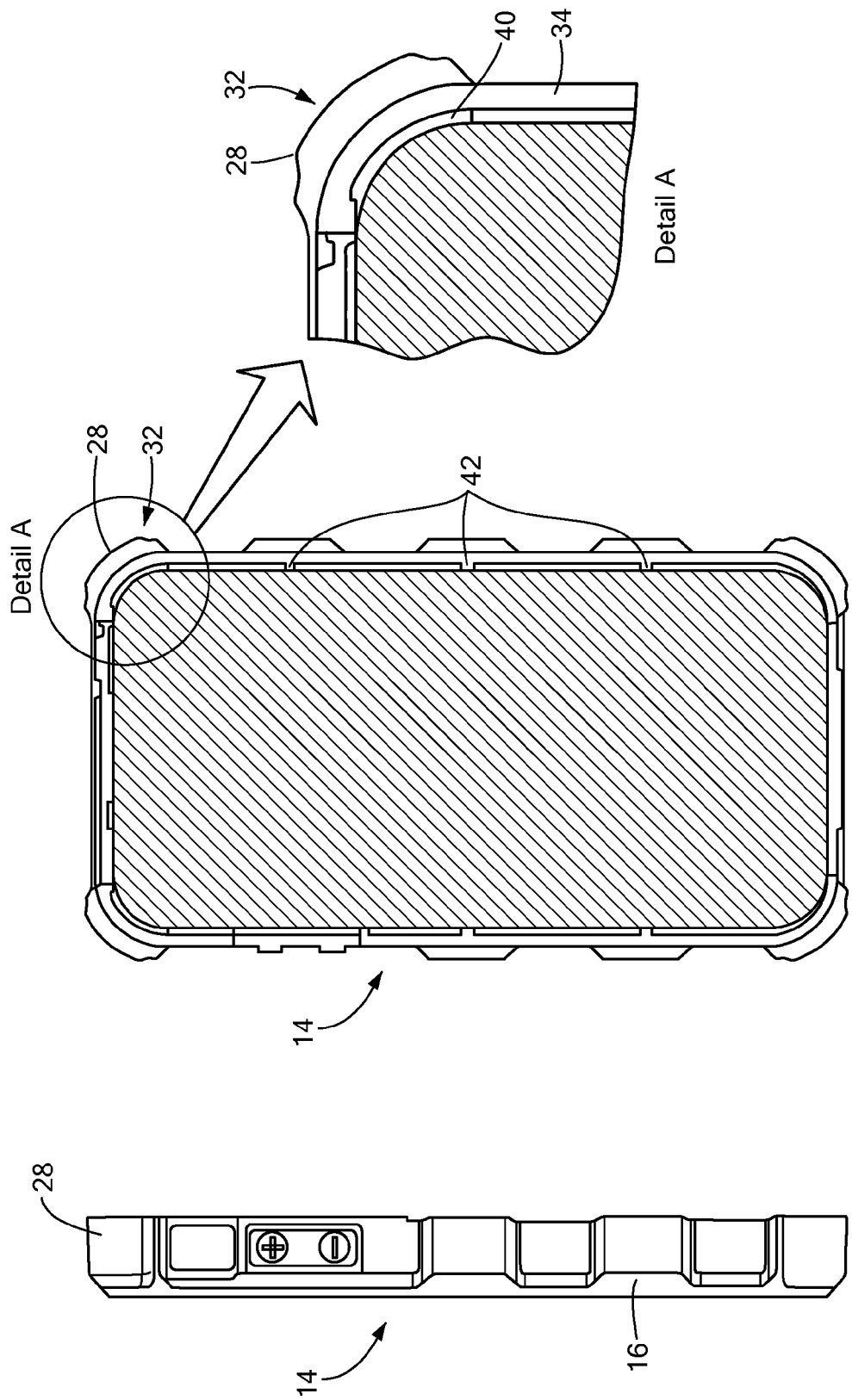
FIG. 4 is a front view and a side view of the mobile device case in FIG. 1 with a cell phone disposed within the housing indicated by the diagonal lines and an enlarged view of Detail A.

Referring now to FIGS. 3 and 4, the interior wall 34 may be substantially concave in shape as to define a gap or deformation region 40 when the mobile device is installed. In particular, the deformation region 40 is empty space into which the corners 32 may flex and elastically deform during an impact on one of the corners 32. The gap 40 allows a space for the corner regions of side wall 16 to flex inward the event of impact allowing the device case 10 to absorb and deflect a large portion of the impact energy away from the mobile device. For example, each of the four corners 32 may include a first segment 28 of the third layer of material 26 molded to the outer surface of the corners 32. These raised first segments 28 may operate to absorb impact energy should the housing 12 receive an impact force on one of the corners 32. However, impact at the corners 32 may cause flexion of the corners 32 inward toward the mobile device when disposed within the housing 12. As such, the deformation region 40 is sufficiently sized to allow flexion of the corners 32 inward without contacting the mobile device.

Optionally, the mobile device may be abutted and spaced a distance from the side wall 16 by a plurality of protrusions 42 extending from the side wall 16 inwardly. The protrusions 42 may be defined by the side wall 16 such that are molded together, and may extend substantially vertically along a vertical axis defined by the side wall 16. Although illustrated as being substantially vertical in orientation, the protrusions 42 may be any shape or size such that the mobile device is spaced a distance from the side wall 16. The protrusions 42 may further operate to prevent the mobile device from moving with the device case 10 during normal movement of the device case 10 or in the event the device case 10 absorbs and impact force. The first portion 14 may further define a recess 44 disposed within each corner 32 sized to receive at least a portion of the second portion 36. For example, the deformation region 40 is defined subjacent to the recess 44 within the corners 32. In an exemplary embodiment, the depth of the recess 44 is shallower than the depth of the deformation region 40. As used herein, the depth of the gap 40 and the recess 44 refers to the distance between the mobile device when disposed within the housing 12, and the side wall 16 that defines the curvature in the corner portion 16. For example, the mobile device may abut a portion of the side wall 16 to define a resting position within the device case 10. This resting position is indicated by the diagonal lines in FIGS. 4-6. Although the diagonal lines are shown a distance from the side wall 16 at locations away from corner portions 32, as noted above, it is contemplated that side walls 16 can be dimensioned such that the mobile device may be in contact with side walls 16 at one or more spots away from corner portions 32.

When at least a part of the second portion 36 is disposed within the recess 44, the recess 44 is at least substantially filled with the part of the second portion 36, while the deformation region 40 remains unfilled. In particular, the second portion 36 may define a lip 46 extending from an interior major side 48 (shown in FIG. 7). The lip 46 may extend around at least a portion of the periphery of the second portion 36 and is sized to be received within a portion of the first portion 14. A portion of the lip 46 may define at least one groove 50 sized to receive at least one tab 52 included on each corner 32 within the recess 44. In an exemplary embodiment, the tab 52 may be disposed on an upper portion of each corner 32 and snap fit within the corresponding groove 50 (FIG. 7) when the second portion 36 is mated with the first portion 14.

Now referring to FIG. 5, in another embodiment, a flexible bladder 54 may be disposable within the deformation region 40 to absorb an impact force on the corners 32 and to cushion the mobile device. The bladder 54 may be sized to fit within the deformation region 38 and deform in response to a force received from the corner 32. The bladder 54 may be composed of a resilient material, for example, rubber, silicon, nylon, and the like, and may be filled with a fluid, for example, compressed air. Each of the corners 32 may contain at least one bladder 54, but it is contemplated that several smaller-sized bladders 54 may be disposed within the deformation region 40. The bladder 54 may be glued or otherwise affixed within each corner 32, or alternatively, may be removeably insertable within the deformation region 40 by the user of the device case 10. The bladder 54 may have sufficient resiliency such that if the corners 32 are flexed inward and compress a portion of the bladder 54, the bladder 54 does not rupture.

Now referring to FIG. 6, in another embodiment, the bladder 54 may be in fluid communication with fluid source 56, for example by a pump through a conduit 58. For example, each bladder 54 may be disposed within each deformation region 40 and define a valve (not shown) allowing fluid to flow into the bladder 54 at a desired pressure, but does not allow fluid to unintentionally flow out of the bladder 54. The valve may be sized to receive a nozzle (not shown) in fluid communication with the conduit 58 and the fluid source 56. In an exemplary operation, the pump 52 may be manually operated to inflate each bladder 54 with a fluid to a desired pressure. Each bladder 54 in each corner 32 may be in fluid communication with the fluid source 56 and filled at a single point. Should pressure in any bladder 54 be lowered owing to deflation over time or an impact, the bladder 54 may be re-inflated by the pump as desired.

Figure 7:
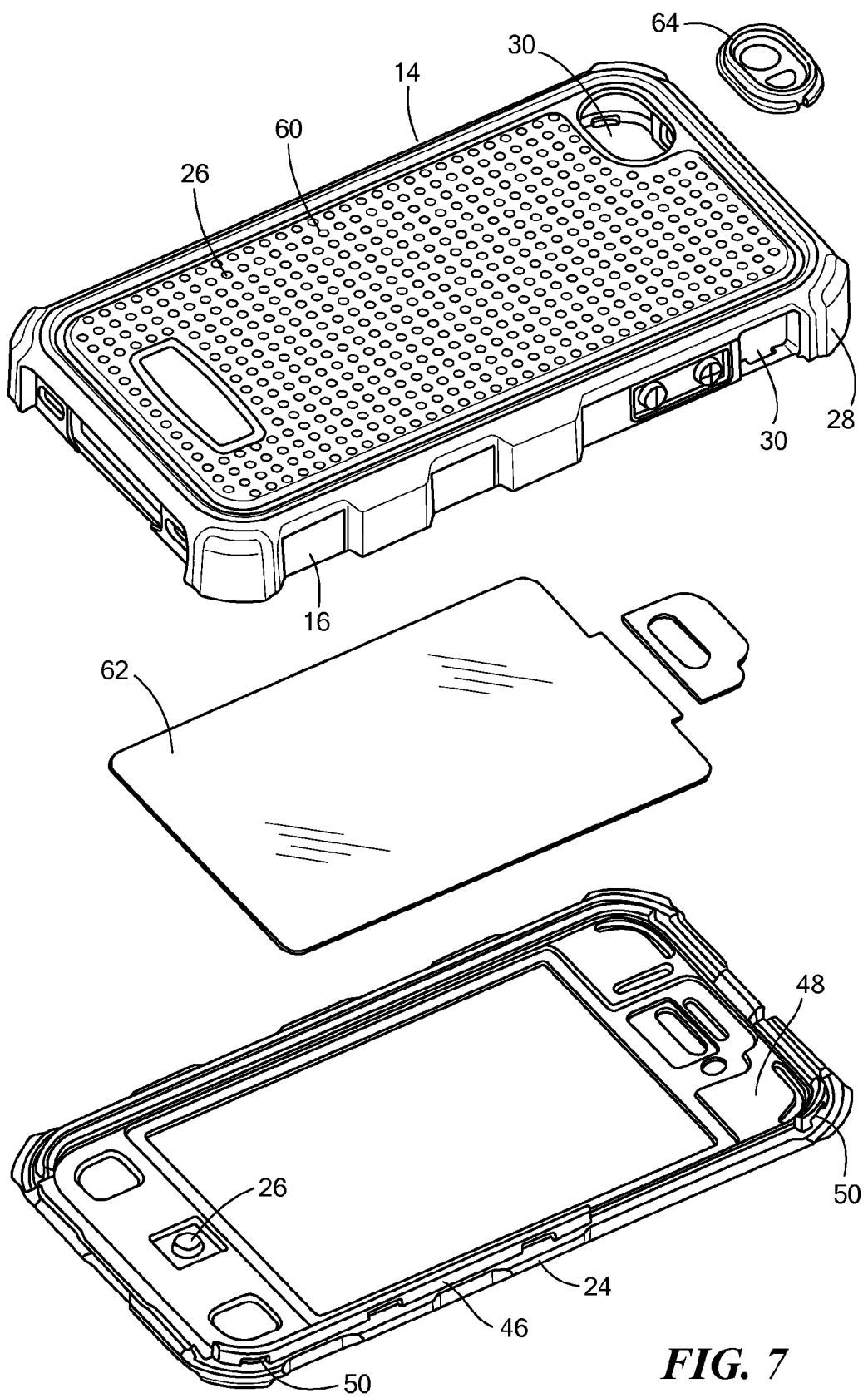
FIG. 7 is a disassembled view of the back portions of the first portion and the second portion shown in FIGS. 1 and 2.

Now referring to FIG. 7, the first portion 14 may include a second major side 60 opposite the first side 22 having the third layer of material 26 deposited on a substantial portion of the second side 60. For example, the third layer of material 26 may be deposited on substantially the entire second side 60 to provide resiliency to the housing 12 should an impact occur. A pattern of alternating portions of the second layer of material 24 and the third layer of material 26 may be disposed on the second side 60 and/or the side wall 16. For example, the second layer of material 24 may define a perimeter about the third layer of material 26 on the second side 60 such that the third layer of material 26 protrudes a distance from the second side 60. Further, the third layer of material 26 may define a textured surface, for example, a stippling pattern, on the second side 58 which may reduce the coefficient of friction with the third layer of material 26 and the user's hand or other surfaces. The stippling pattern may be formed by the creation of plurality of indentations on the third layer of material 26.

The second portion 36 may further define an opening and include a substantially transparent or entirely transparent flexible membrane 62 sized to cover the opening. In operation, the flexible membrane 62 covers a touch-screen of a mobile device when the mobile device is disposed within the housing 12. The flexible membrane 62 may operate to prevent the touch-screen from being scratched while maintaining the operation of the touch-screen through the flexible membrane 62.

Optionally, a removeably insertable or integrated camera module 64 may be included and sized to fit within the aperture 30 and provide access to a mobile device camera and flash. The camera module 64 may be at least partially composed of the same or similar durometer material as the third layer of material 26 and may include a transparent membrane to protect the camera from scratching or other unwanted debris. The camera module 64 may further define a shape and size such that when the camera is in operation, the camera flash does not interfere with the image capture process. For example, a septum may be defined by the camera module disposed between the camera and the flash. The septum may operate to minimize interference from the flash on the lens of the camera during image capture.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A case sized to receive a mobile device, the case comprising:
 a first portion; and
 a second portion separable from the first portion, the second portion including a perimeter portion, the perimeter portion defining at least one groove;
 the first portion including:
  an interior portion;
  a side wall defining a perimeter around the interior portion, the side wall further defining a plurality of corner portions, the side wall further including at least one tab engageable with the at least one groove to removeably engage the first portion to the second portion; and
  a plurality of protrusions affixed to the side wall and spaced a distance away from each other, the plurality of protrusions being configured to space the mobile device a distance away from the side wall and the plurality of corner portions creating a deformation region between the mobile device and the first portion when the mobile device is received within the first portion, the deformation region having a depth, and each corner portion further defining a recess having a depth less than the depth of the deformation region; and a flexible bladder disposed within the deformation region.

2. The mobile device case of claim 1, wherein the second portion defines at least one lip, and wherein the tab is disposed on at least one of the at least one lip.

3. The mobile device case of claim 1, wherein the deformation region is defined subjacent to the recess.

4. The mobile device case of claim 1, further including a first layer of material having a durometer of substantially 80 A contoured about at least a portion of each of the plurality of corner portions.

5. The mobile device case of claim 4, further including a second layer of material having a durometer of substantially 60 A molded to the first layer of material.

6. A mobile device case sized to receive a mobile device, the mobile device case comprising:
   a first portion; and
   a second portion, the second portion being matable to and separable from the first portion;
   the first portion including:
      a side wall defining an interior;
      a plurality of corner portions;
      a plurality of protrusions affixed along at least a portion of the interior of the side wall and configured to space the mobile device a distance away from the side wall and the plurality of corner portions creating a deformation region between a corner of the mobile device and the first portion when the mobile device is retained within the first portion; and
      a flexible bladder disposed within each of the plurality of corner portions.

7. The mobile device case of claim 6, wherein the protrusions are molded into a portion of the side wall.

8. The mobile device case of claim 6, wherein each of the plurality of corner portions includes a resilient layer of material disposed about at least a portion of the exterior of the side wall and at least a portion of each of the plurality of corner portions.

9. The mobile device case of claim 6, wherein the second portion defines a lip sized to be received by the first portion.

10. A case sized to receive a mobile device, the case comprising:
    a first portion; and
    a second portion separable from the first portion, the second portion including a perimeter portion, the perimeter portion defining a first mating element;
    the first portion including:
       an interior portion;
       a side wall defining a perimeter around the interior portion, the side wall further defining a plurality of corner portions, the corner portions defining a deformation region, the side wall further including a second mating element matable with the first mating element to releasably engage the first portion to the second portion[H]
       a plurality of protrusions affixed to the side wall and spaced a distance away from each other, the plurality of protrusions being configured to space the mobile device a distance away from the side wall and each deformation region when the mobile device is received within the first portion; and
    a flexible bladder disposed within the deformation region.

11. The mobile device case of claim 10, wherein the perimeter portion includes a lip extending from the perimeter portion, and wherein the first mating element is included on the lip.

12. The mobile device case of claim 10, further including a first layer of material having a durometer of substantially 80 A contoured about at least a portion of each of the plurality of corner portions.

13. The mobile device case of claim 12, further including a second layer of material having a durometer of substantially 60 A molded to at least a portion of the first layer of material.

14. The mobile device case of claim 10, wherein the second portion includes a screen protector.

15. The mobile device case of claim 10, wherein the deformation defines a depth, wherein each corner portion defines a recess having a depth less than the depth of the deformation region.

* * * * *